United States Patent [19]

Okino et al.

[11] Patent Number: 4,576,456
[45] Date of Patent: Mar. 18, 1986

[54] IMAGE SENSING SYSTEM

[75] Inventors: Tadashi Okino, Tokyo; Syuichiro Saito, Kanagawa, both of Japan

[73] Assignee: Canon Kabushiki Kaisha, Tokyo, Japan

[21] Appl. No.: 550,237

[22] Filed: Nov. 8, 1983

[30] Foreign Application Priority Data

Nov. 10, 1982 [JP] Japan ................................ 57-196927

[51] Int. Cl.$^4$ ............................................... G03B 9/10
[52] U.S. Cl. .................................................... 352/216
[58] Field of Search ................................ 352/214, 216

[56] References Cited

U.S. PATENT DOCUMENTS 2,166,947 7/1939 Fayerweather ...................... 352/214
3,300,271 1/1967 Yamamoto ........................... 352/214

Primary Examiner—Monroe H. Hayes
Attorney, Agent, or Firm—Toren, McGeady, Stanger, Goldberg & Kiel

[57] ABSTRACT

An image sensing system having an image sensing part for sensing the image of an object to be photographed, two shutter blades which block image light, two motors arranged to drive the two shutter blades respectively and a control circuit arranged to keep a turning phase difference unvarying between the two motors.

7 Claims, 7 Drawing Figures

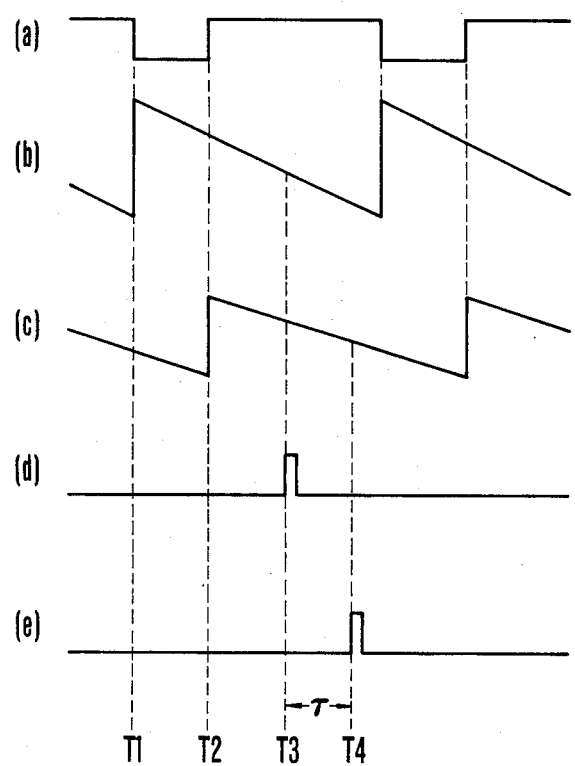

IMAGE SENSING SYSTEM

BACKGROUND OF THE INVENTION

1. Field of the Invention

This invention relates to a system for sensing the image of an object to be photographed and more particularly to an image sensing system including control means for controlling the exposure time of the system.

2. Description of the Prior Art

There have been known shutters of the kind called rotary shutters. The rotary shutter has two shutter blades which are arranged to turn in the same direction at the same speed and consist of light blocking parts and light transmitting parts. The exposure time of the shutter is controlled by controlling the opening angle of the part where these light transmitting parts overlap each other.

FIG. 1 of the accompanying drawings shows the arrangement of the conventional rotary shutter in an exploded oblique view. The shutter arrangement includes an image sensing part 30 which is a charge coupled device (CCD), a camera tube, 8 mm film or the like; a driving motor 31; a shaft 32 of the motor 31 which is provided with a groove 32a; and shutter blades 33 and 34 which are made of thin plates and are formed into a semicircular shape. The shutter blade 33 is secured to the shaft 32 and turns in the direction of the arrow when a current is supplied to the motor 31. An opening angle adjustment shaft 35 is provided with a piercing hole 35a and is rotatably attached to the shaft 32. One end 35c of the angle adjustment shaft 35 is secured to the shutter blade 34. The shaft 35 is further provided with a cam slot 35b. A slider 36 has a piercing hole 36a and is rotatably mounted on the opening angle adjustment shaft 35 by this hole 36a. The slider 36 also has a pin 37 mounted thereon. The pin 37 extends inwardly to enter the groove 32a via the cam slot 35b. A control plate 38 is provided with holes 38a and 38b and is arranged to be shiftable along a guide shaft 40 by virtue of these holes. To the control plate 38 is secured a pin 39 which engages an outer circumferential groove 36b of the slider 36.

The conventional rotary shutter operates as follows: When a current is supplied, the motor 31 causes the shutter blade 33 which is secured to the shaft 32 to turn in the direction of arrow as shown. The rotation of the motor 31 is transmitted to the opening angle adjustment shaft 35 via the groove 32a, pin 37 and cam slot 35b. This causes the other shutter blade 34 to turn also in the direction of the arrow. If the control plate 38 is moved rightward as viewed on the drawing, the pin 37 is caused to move also rightward via the pin 39 and the groove 36b. As a result, the shutter blade 34 is caused via the cam slot 35b and the groove 32a to turn to the left relative to the shutter blade 33 (in the direction of the arrrow) to make the opening angle smaller and, accordingly, to shorten shutter time. Further, if the control plate 38 is moved leftward as viewed on the drawing, an operation which is the reverse of the above causes the shutter blade 34 to turn rightward relative to the other shutter blade 33 in a direction reverse to the direction of the arrow shown in the drawing. This results in a larger opening angle to make the shutter time longer. The shutter is thus arranged to permit control over the exposure time in this manner.

As will be understood from the above description, the conventional rotary shutter necessitates use of many parts for its structural arrangement and thus also results in a complex structure. The complex structural arrangement then tends to have excessive play or back-lash and wear, etc. which degrade the precision, reliability and the service life of the shutter.

SUMMARY OF THE INVENTION

In view of the above-stated shortcomings of the prior art, an object of the present invention is to provide an image sensing system which permits reduction in the number of mechanical parts and simplification of the structural arrangement including highly accurate exposure time control means. Another object of the invention is to provide an image sensing system including highly reliable exposure time control means which obviates the necessity of a mechanical contact arrangement.

The above and further objects and features of the invention will become apparent from the following detailed description of preferred embodiments thereof taken in conjunction with the accompanying drawings.

BRIEF DESCRIPTION OF THE DRAWINGS

FIG. 7 is a wave form chart showing the wave forms of signals produced from the various parts of the control circuit shown in FIG. 6.

DETAILED DESCRIPTION OF THE PREFERRED EMBODIMENTS

Figure 1:
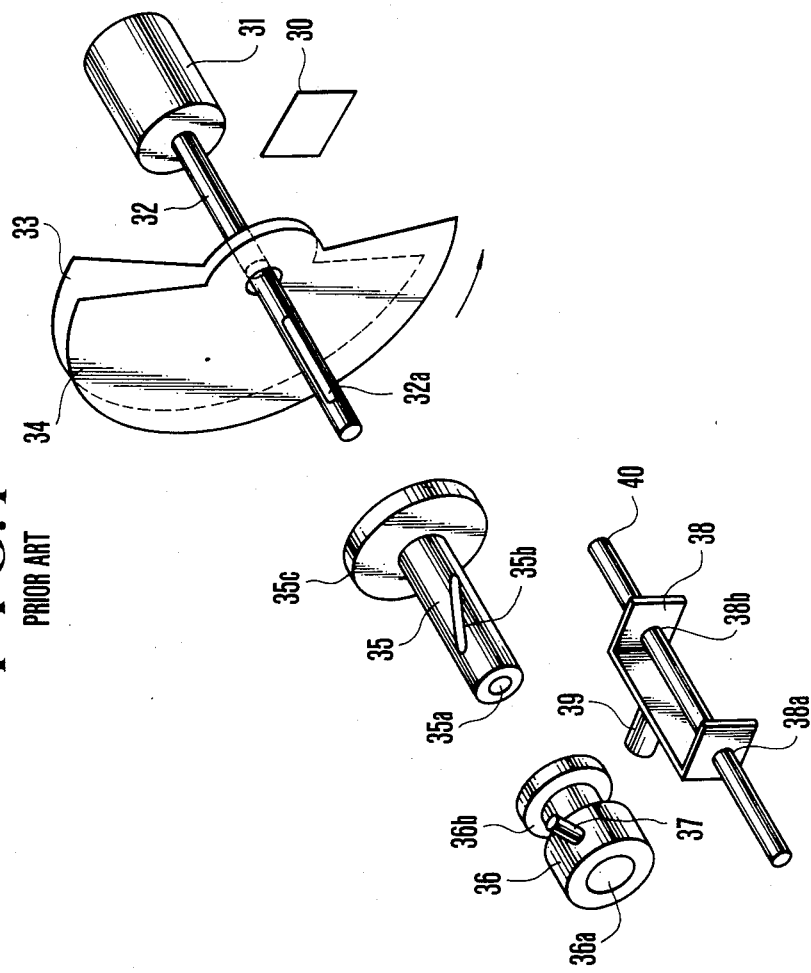
FIG. 1 is an exploded oblique view of the conventional rotary shutter.
Figure 2:
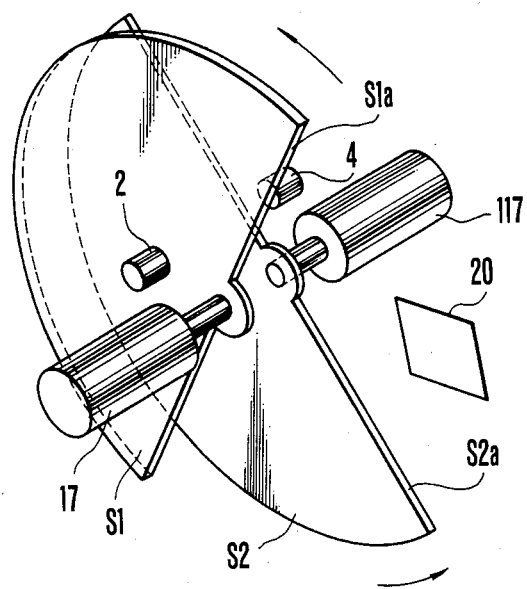
FIG. 2 is an oblique view of a rotary shutter arranged according to the present invention and depicting an embodiment thereof.

An embodiment example of the invention is arranged as shown in an oblique view in FIG. 2. The embodiment includes a light emitting element 2; a light sensitive element 4; a solid-state image sensor 20 such as a CCD, a BBD or the like; shutter blades S1 and S2; and first and second motors 17 and 117 which are respectively arranged to turn the shutter blades S1 and S2. The shafts of the motors 17 and 117 are respectively secured to the shutter blades S1 and S2. The shutter blades turn on these shafts in the direction indicated for each shutter blade respectively by an arrow when a current is applied to the motors. The exposure time of the image sensor 20 is controlled by adjusting an angle defined by the sides S1a and S2a of these shutter blades. The exposure time is measured by means of the light emitting element 2 and the light sensitive element 4 which are arranged across the shutter baldes S1 and S2.

Figure 3:
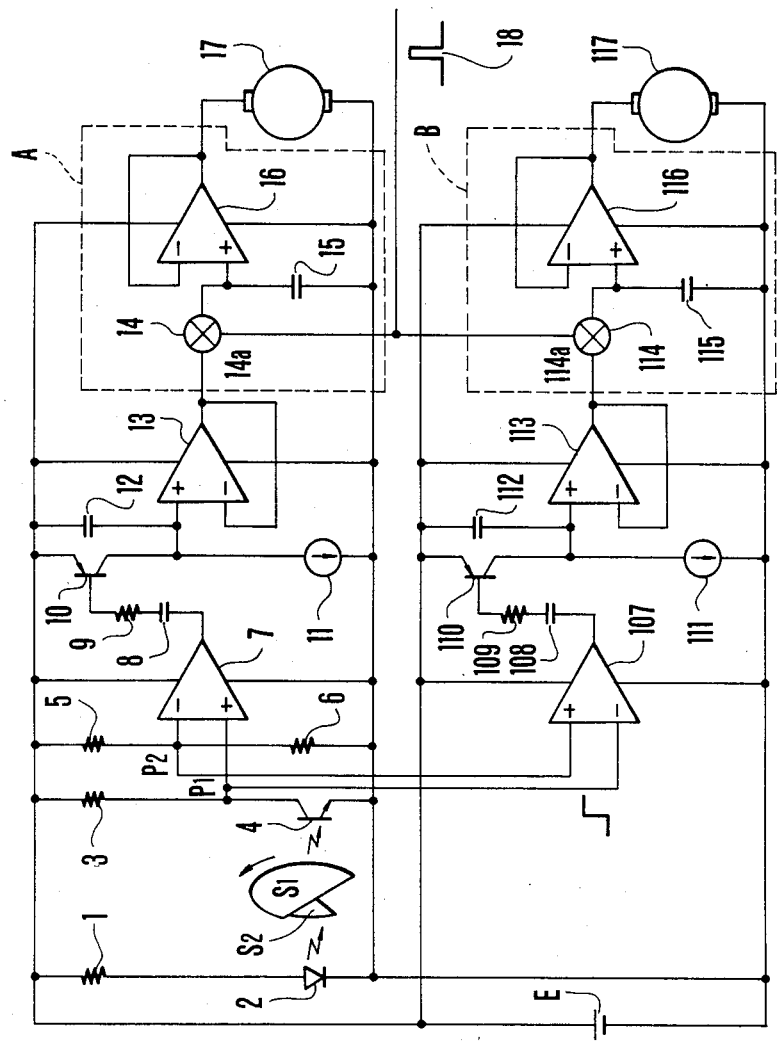
FIG. 3 is a circuit diagram showing the control circuit of the embodiment.

FIG. 3 is a circuit diagram showing by way of example a driving circuit for driving the rotary shutter shown in FIG. 2. The circuit of FIG. 3 includes: a series circuit consisting of a resistor 1 and a light emitting element 2 such as an LED or the like; a series circuit of a resistor 3 and a light sensitive element 4; a series circuit of resistors 5 and 6; a series circuit of a comparator 7, capacitor 12 and a constant current source 11; and a parallel circuit of operation amplifiers 13 and 16 connected in parallel with a power source E. The comparator 7 has its inversion input terminal connected to a connection point P2 between the resistors 5 and 6 and its non-inversion input terminal connected to a connection point P1 between the resistor 3 and the light sensitive element 4. The output terminal of the comparator 7 is connected to the base of a transistor 10 via a series circuit consisting of a capacitor 8 and a resistor 9. The transistor 10 has its emitter connected to the anode of the power source E while its collector is connected to a connection point between the capacitor 12 and the constant current source 11 and also to the non-inversion input terminal of the operational amplifier 13. The operational amplifier 13 has its output terminal and its inversion input terminal directly connected to each other and thus serves as a buffer. The output terminal of the operational amplifier 13 is further connected to the non-inversion input terminal of the operational amplifier 16 via an analog switch 14. Between the non-inversion input terminal of the operational amplifier 16 and the cathode of the power source E is connected a capacitor 15. The operational amplifier 16 also serves as buffer with its inversion input terminal and its output terminal directly connected to each other. The output terminal of the operational amplifier 16 is further connected to the cathode of the power source (battery) E via the first motor 17.

A lower half circuit portion of FIG. 3 consisting of elements 107–117 which are identical with the elements 7–17 is arranged in exactly the same manner as the circuit portion consisting of the elements 7–17 with the exception that the comparator 107 has its inversion input terminal connected to the connection point P1 and its non-inversion input terminal to the connection point P2. The arrangement of this circuit portion, therefore, requires no further description. Each of the analog switches 14 and 114 becomes conductive when their control terminals 14a and 114a are at a high level and non-conductive when these terminals are at a low level. When the analog switches 14 and 114 are conductive, the output voltages of the operational amplifiers 13 and 113 are sampled to the capacitors 15 and 115. While these analog switches 14 and 114 are non-conductive, the capacitors 15 and 115 retain their electric charges (voltages) which are obtained during the sampling process. The electric charges retained at the capacitors 15 and 115 are produced via the buffers 16 and 116 at a low impedance. In other words, sample-and-hold circuits A and B are formed jointly by the elements 14, 15 and 16 and the elements 114, 115 and 116 respectively. Further, the control electrodes 14a and 114a of the analog switches 14 and 114 are connected directly to each other. A vertical synchronizing signal 18 which is arranged to drive a solid-state image sensor 20 is applied to these electrodes 14a and 114a.

As described in the foregoing, the semi-circular shutter S1 and S2 which are respectively attached to the shafts of the motors 17 and 117 are disposed between the light emitting element 2 and the light sensitive element 4. The exposure time is measured on the basis of the output of the light sensitive element 4.

Figure 4:
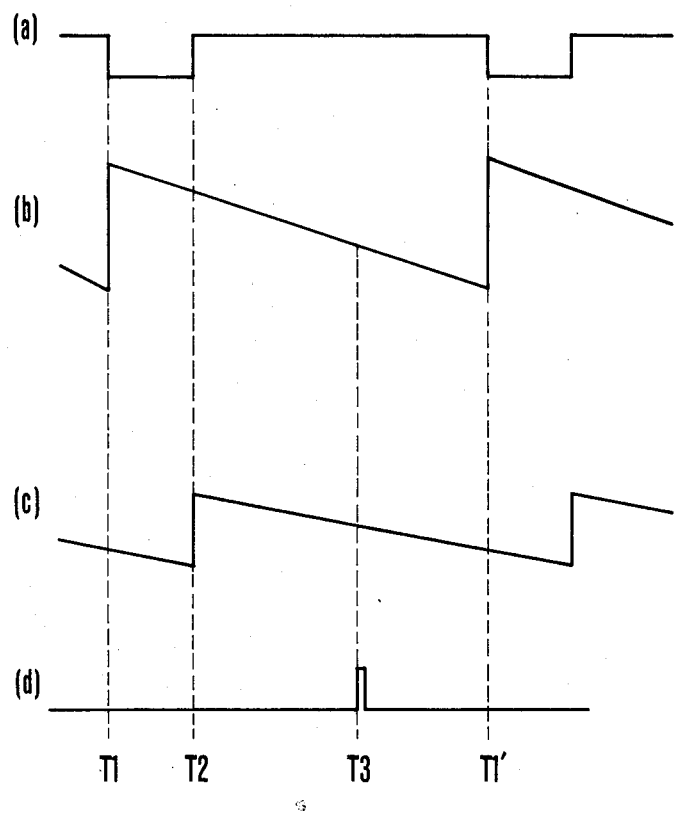
FIG. 4 is a wave form chart showing the wave forms of signals produced from various parts of the control circuit shown in FIG. 3.

While the light from the light emitting element 2 is blocked and hindered by the shutter blades S1 and S2 from reaching the light sensitive element 4, no current flows to the element 4 and the voltage at the connection point P1 is approximately equal to the power source voltage. When the motor rotation shifts the shutter blade S1 at a point of time T1 from its position covering the light emitting element 2 and the light sensitive element 4 to a position allowing light to pass, the light of the light emitting element 2 reaches the light sensive element 4. Then, the light sensitive element 4 becomes conductive to lower the potential of the connection point P1 to a value close to zero. When further motor rotation causes the shutter blade S2 at a point of time T2 again to block the light from the light emitting element 2, the light sensitive element 4 no longer receives the light and thus becomes non-conductive. The voltage at the connection point P1 increases up to a value close to the power source voltage. This condition lasts until the shutter blades S1 is shifted at a point of time T1' by motor rotation from a light blocking position to a position no longer blocking the light. The variation with time of the potential of the connection point P1 is as shown in FIG. 4.

Assuming that the resistance values of the resistors 5 and 6 are arranged to be equal to each other, the potential at the connection point P2 is about ½ of the power source voltage. As will be apparent from FIG. 4 (a), the potential of the connection point P1 changes from the power source voltage value to a value close to zero. More specifically, at the time T1 when the light comes to the light sensitive element 4, the high-and-low relation between the potential of the point P1 and that of the point P2 is reversed and the output level of the comparator 7 changes from a high level to a low level. At that instant, a base current flows via the series circuit of the capacitor 8 and the resistor 9 to the transistor 10 to cause the transistor 10 to turn on. With the transistor 10 turned on, the two terminals of the capacitor 12 are short-circuited and the electric charge of the capacitor 12 is discharged. The base current flows to the transistor 10 only while the capacitor 8 is being charged via the resistor 9. Accordingly, if the time constant for this charging process is arranged to be sufficiently short, the transistor 10 momentarily turns on to have the electric charge of the capacitor 12 discharged and then again turns off. After that, the capacitor 12 is charged by the constant current source 11. The voltage Vc(t) between the terminals of the capacitor 12 at time t can be expressed as follows:

$$Vc(t) \approx I11 \times (t - T1)/C12 \qquad (1)$$

Wherein I11 is the current value of the constant current source 11 and

C12 is the electrostatic capacity of the capacitor 12.

Therefore, the terminal voltage V13(t) of the non-inversion input terminal of the operational amplifier 13 can be expressed as follows:

$$V13(t) \simeq Vcc - \frac{I11 \times (t - T1)}{C12} = Vcc - Vc(t) \qquad (2)$$

Wherein Vcc is the Power source voltage.

Since the operational amplifier 13 is arranged to serve as a buffer (or voltage follower) with its inversion input terminal and its output terminal connected directly to each other, the output voltage of the operational amplifier 13 is equal to its input voltage. Therefore, this can be expressed by Formula (2) above. This is also represented by FIG. 4(b).

Upon arrival of the vertical synchronizing signal 18, the sample-and-hold circuit A operates to sample the output voltage of the operational amplifier 13 obtained at the time of arrival of this vertical synchronizing signal. After that, the sampled voltage is kept in the output of the sample-and-hold circuit A to drive the motor 17 therewith. Assuming that the arrival time of the vertical synchronizing signal is T3, the voltage expressed by Formula (2) and obtained at the time T3 is retained. The output voltage VA of the sample-and-hold circuit A obtained after the time T3 can be expressed as follows:

$$VA = Vcc - \frac{I11 \times (T3 - T1)}{C12} \quad (3)$$

In the event that the phase of the shutter blade S1 is delayed from a correct phase, that is, when the time T1 is too late to have the arrival time T3 of the synchronizing signal in the middle point and thus becomes time T1+ΔT1, the sample-and-hold voltage VA' becomes expressed as follows:

$$VA' = Vcc - \frac{I11 \times (T2 - T1 - \Delta T1)}{C12} = VA + \frac{I11 \times \Delta T1}{C12} \quad (4)$$

In that event, the motor is driven with a higher voltage than a normal voltage to bring the shutter blade S1 back to a correct phase by advancing the phase thereof. In a case where the phase of the shutter blade S1 occurs ahead of the correct state, the motor is driven with a lower voltage than a normal voltage to retard the phase of the shutter blade S1 to bring it back to the correct phase. Further, at the time T2, the output level of the comparator 7 changes from a low level to a high level. On this occasion, however, no base current flows to the transistor 10 via the capacitor 8 and a resistor 9. Therefore, the transistor 10 remains off and this brings about no adverse effect on the charging process for the capacitor 12 as shown by FIG. 4 (b). The arrangement decribed above, therefore, ensures that the turning phase of the shutter blade S1 is controlled to be in an unvarying relation to the vertical synchronizing signal.

Next, let us now review the lower half portion of FIG. 3 including the elements 107–117. This lower portion differs from the upper half portion in that the connection point P1 is connected to the inversion input terminal of the comparator 117 and the point P2 to the non-inversion input terminal of the comparator 117. In the lower half portion, the inversion and non-inversion input terminals of the comparator 117 are thus reversely connected. Accordingly, the output level of the comparator 107 changes from a high level to a low level at the time T2 when the potential of the point P1 changes from approximately zero voltage to a value close to the power source voltage Vcc. At that instant, the transistor 110 turns on for a moment to short-circuit the two terminals of the capacitor 112. After that the capacitor 112 is charged by the constant current circuit 111 in the same manner as in the case of the upper half portion. A voltage VB which appears at the output terminal of the sample-and-hold circuit B can be expressed as follows:

$$VB = Vcc - \frac{I111 \times (T3 - T2)}{C112} \quad (5)$$

The turning phase of the shutter blade S2 thus can be controlled to be in a predetermined relation to the vertical synchronizing signal. The output variation characteristic of the operational amplifier 113 is as represented by FIG. 4 (c) while the vertical synchronizing signal is as represented by FIG. 4 (d).

Assuming that the motors 17 and 117 are identical with each other, the sample-and-hold voltages of the upper and lower half portions must be equal to each other under a correct phase controlling condition.

$$VA = VB \quad (6)$$

Therefore, there obtains the following relation:

$$\frac{I11 \times (T3 - T1)}{C12} = \frac{I111 \times (T3 - T2)}{C112} \quad (7)$$

In other words, the relation between T1 and T2, i.e. the exposure time T2−T1, can be controlled by adjusting the current value of either the constant current source 11 or 111.

In this embodiment, the motors are attached respectively to the two shutter blades and their turning phases are arranged to be controlled independently of each other. This arrangement permits reduction of the number of parts required and simplification of the structural arrangement to a great extent. It is another advantage that the actual opening angle (exposure time) is arranged to be detected without having recourse to any mechanical contact arrangement and that feedback control is accomplished on the basis of the result of this detection. Therefore, unlike the conventional arrangement, accuracy and reliability are never degraded by excessive play or back-lash and wear of parts. The service life of the system can be lengthened significantly since the fear of excessive play and wear is completely obviated by the non-contact arrangement according to the invention.

Figure 5:
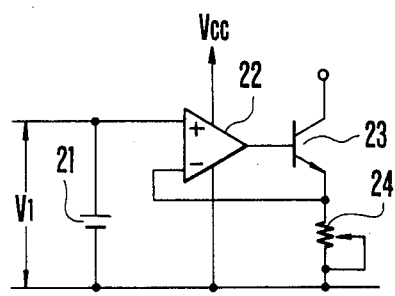
FIG. 5 is a circuit diagram showing by way of example the constant current circuit of the embodiment.

FIG. 5 shows an example of the constant current circuit in which the constant current value is arranged to be variable. This circuit includes a power source 21 for a voltage V1, an operational amplifier 22, a transistor 23 and a variable resistor 24. When the voltage V1 is applied to the non-inversion input terminal of the operational amplifier 2, the inversion input terminal of the amplifier 2 comes to have the same potential as that of the non-inversion input terminal. Therefore, the voltage between the terminals of the resistor 24 is also kept at the voltage value V1. Assuming that the resistance value of the variable resistor 24 is R4, the current flowing to the resistor can be expressed as follows:

$$\frac{V1}{R4} \quad (1)$$

Therefore, a current of a value equal to the value of Formula (1) flows to the collector of the transistor 23 irrespectively of load impedance.

Therefore, with the constant current circuit 111 arranged as shown in FIG. 5, a desired opening angle, or exposure time, is obtainable by adjusting the resistance value of the variable resistor 24.

Figure 6:
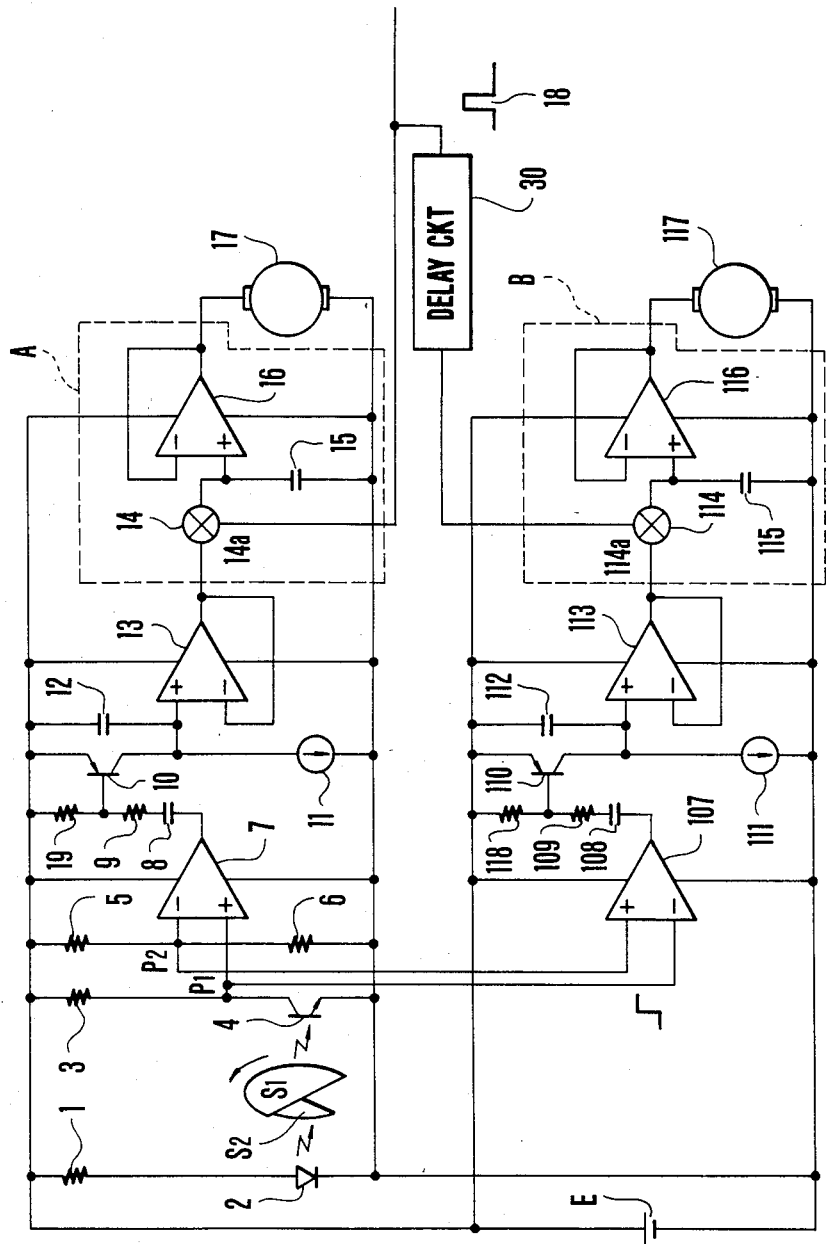
FIG. 6 is a circuit diagram showing the control circuit of another embodiment.

An example of a modification of the circuit arrangement of FIG. 3 is as shown in FIG. 6. In FIG. 6, the circuit elements that perform the same functions as those shown in FIG. 3 are indicated by the same reference numerals. The modification includes resistors 19 and 118 which are provided for the discharging actions of the capacitors 8 and 108 for the purpose of stabilizing the circuit operation; and a delay circuit 30 which is arranged to delay the vertical synchronizing signal 18 before the signal 18 is supplied to the control electrode 114a.

The operation of the circuit shown in FIG. 6 is about the same as the circuit of FIG. 3. The only difference between them resides in that the sampling times T3 and T4 of the sample-and-hold circuits A and B differ from each other by time τ as shown in FIG. 7. The phase of each of the shutter blades is arranged to be kept unvarying. In this case, a desired opening angle, i.e. a desired exposure time, is obtainable by adjusting the delay time of the delay circuit 30. Referring to FIG. 7, the parts (a), (b), (c) and (d) of FIG. 7 represent signal wave forms similar to those shown in FIG. 4 while another part (e) represents the output wave form of the delay circuit 30.

As has been described in the foregoing, the image sensing system according to the invention is provided with exposure time control means together with two shutter blades; and two rotative driving means for driving the shutter blades. The exposure time control means is arranged to control the difference between the rotating phases of the two driving means to keep it unvarying. The invented arrangement permits simplification of the structural arrangement and also highly accurate exposure time control. Further, in accordance with the embodiments described, the exposure time is arranged to be detected in a non-contacting manner to ensure highly reliable exposure time control. While the solid-state image sensor is employed in each of the embodiments described, it goes without saying that the invention is applicable also to systems using a camera tube, silver salt film, etc. as the image sensor.

Further, the invention is not limited to the embodiments described in the foregoing and it is to be understood that changes and variations may be made without departing from the scope of the following claims.

What we claim:

1. An image sensing system comprising:
   image sensing means for sensing the image of an object to be photographed;
   two shutter blades which block image light coming toward said image sensing means;
   two rotative driving means for driving said two shutter blades respectively;
   control means for controlling the difference in rotating phase between said two rotative driving means to keep the difference unvarying;
   wherein said control means includes detecting means for detecting the rotating phases of said two rotative driving means;
   wherein said detecting means is arranged to detect a time at which the first shutter blade completes a light blocking action and to detect a time at which the second shutter blade commences a light blocking action;
   wherein said control means includes a first signal generating means for producing a first signal which varies with the lapse of time after completion of the light blocking action and a second signal generating means for producing a second signal which varies with the lapse of time after the commencement of the light blocking action; and
   wherein each of said first and second signal generating means includes a constant current circuit and a capacitor which stores electric charge of a current flowing from said constant current circuit.

2. A system according to claim 1, wherein said control means includes variable control means for variably controlling said difference in phase.

3. A system according to claim 1, wherein said detecting means includes a light emitting element and a light sensitive element which are arranged with said two shutter blades interposed between them.

4. A system according to claim 1, wherein said control means includes a variable control member which varies the current value of the constant current circuit covered by at least one of said first and second signal generating means.

5. A system according to claim 1, wherein said control means includes first and second sample-and-hold circuits which are arranged to sample-and-hold said first and second signals at predetermined timings respectively.

6. A system according to claim 5, wherein said control means includes a variable control circuit which variably controls the sampling timing of at least one of said first and second sample-and-hold circuits.

7. A system according to claim 5, wherein said image sensing means is a solid-state image sensor and the sampling signals of said sample-and-hold circuits are synchronized with a vertical synchronizing signal which is arranged to have said image sensor driven according thereto.

* * * * *